United States Patent [19]

Satrapa

[11] 4,395,707
[45] Jul. 26, 1983

[54] LIGHT PEN CONTROLLED METHOD AND EQUIPMENT FOR EVALUATING FLUORESCENT SCREEN PICTURES

[75] Inventor: Jaroslav Satrapa, Timelkam, Austria

[73] Assignee: Kretztechnik Gesellschaft m.b.H., Zipf, Austria

[21] Appl. No.: 108,647

[22] Filed: Dec. 31, 1979

[30] Foreign Application Priority Data

Jan. 31, 1979 [AT] Austria ................... 694/79

[51] Int. Cl.³ ................................. G09G 1/28
[52] U.S. Cl. ................... 340/703; 340/707; 340/723; 358/81
[58] Field of Search .............. 340/703, 707, 723; 358/81

[56] References Cited

U.S. PATENT DOCUMENTS

| | | | |
|---|---|---|---|
| 3,441,667 | 4/1969 | Novacek | 340/709 |
| 3,662,373 | 5/1972 | Schumann | 340/709 |
| 3,997,891 | 12/1976 | Iwamura et al. | 340/707 |
| 4,149,184 | 4/1979 | Giddings et al. | 340/703 |
| 4,162,494 | 7/1979 | Bacon | 340/703 |
| 4,189,743 | 2/1980 | Schure et al. | 340/707 |
| 4,190,833 | 2/1980 | Bejting et al. | 340/707 |
| 4,200,867 | 4/1980 | Hill | 340/703 |
| 4,232,311 | 11/1980 | Agneta | 340/707 |

Primary Examiner—Marshall M. Curtis
Attorney, Agent, or Firm—Kurt Kelman

[57] ABSTRACT

A light pen directed toward an area of a fluorescent screen controls a pulse generator, which causes said area to be brightened and also causes a defined target mark to be displayed. The coordinates of the target mark may be ascertained from the instantaneous deflecting voltages which control the electron beam and may be indicated or stored or supplied to a computer for evaluation. In such computer, the coordinates of a plurality of target marks may be used to ascertain the length of curves and contours or the areas of regions which have been circumscribed with the light pen. Various possible uses and methods of evaluation are described as well as equipment for carrying out the method.

10 Claims, 3 Drawing Figures

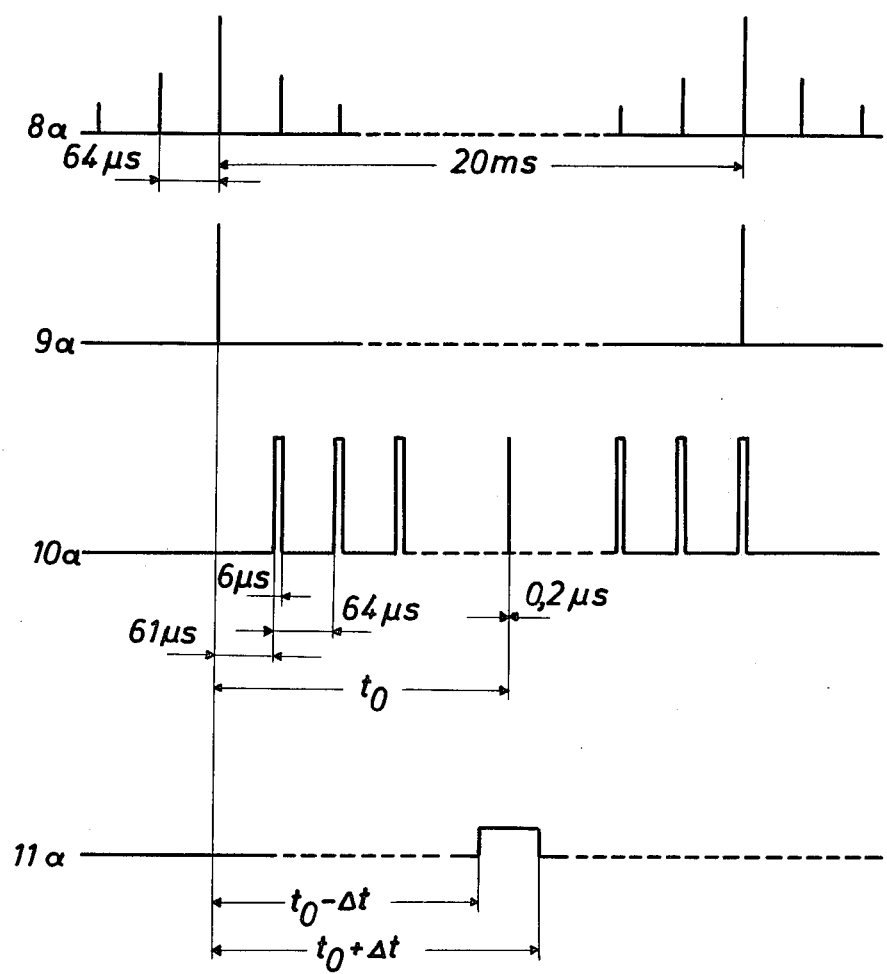

LIGHT PEN CONTROLLED METHOD AND EQUIPMENT FOR EVALUATING FLUORESCENT SCREEN PICTURES

BACKGROUND OF THE INVENTION

This invention relates to a method of marking and evaluating screen displays or for taking measurements therein, particularly in connection with section displays generated by the ultrasonic pulse-echo method, wherein a light pen is used, which in an operative position directs a receiving optical system against fluorescent screen areas that are brightened by the electron ray and by an amplification or transformation of the light received by the optical system from said areas generates bright-up pulses for intensifying the electron beam as it scans the area to which the light pen is directed so that a light spot appears in said area.

The invention relates also to equipment for carrying out said method, comprising a fluorescent screen unit having a fluorescent screen on which an electron beam is adjustable, particularly line by line, by deflecting means, whereas the intensity of said electron beam is controlled by brightness control means, and a light pen which generates bright-up pulses for the electron beam under control of a receiving optical system that is responsive to the brightness of the fluorescent screen.

It is often necessary to take measurements in screen displays or to ascertain the relation of a plurality of different targets. It is also often desired to emphasize specific regions of a display by additional marks. Such problems arise also in section displays generated on a screen as a result of ultrasonic examinations. The problems involved will now be discussed mainly in connection with such section displays. In the simplest case it is necessary to measure the coordinates of a given point of the display. It may also be necessary to ascertain the distances between two or more different points or in complicated cases the length even of irregularly curved lines or to determine the area of regions which may be defined at least in part by irregular lines. A direct measurement on the fluorescent screen would be inaccurate because optical distortions and a resulting parallax error must be expected owing to the thickness of the fluorescent screen and of a protective pane which may be disposed in front of the fluorescent screen. Additional distortions may arise mainly in marginal regions of a fluorescent screen as a result of structure-induced influences on the movement of the electron beam and which also adversely affect the accuracy of measurements taken directly on the fluorescent screen by directly applied measuring instruments. In an endeavour to eliminate these errors at least in part, it is known to take a photograph of the screen display and to take the required measurements on the photograph, although that practice will not eliminate the errors due to marginal distortion and does not save a substantial amount of time regarding the taking of the measurement. On the contrary, there is a lapse of time until the photograph has been developed so that the evaluation cannot be effected virtually simultaneously with the observation of the fluorescent screen, as is often desired. Whereas it is known to include scales or adjustable light marks in the screen display, that practice permits only a measurement of the distance between individual points and involves a comparatively high electronic expenditure. It is desirable for an increase of the accuracy of the measurement and of the speed with which measurements can be taken to provide simple means by which data that can be obtained from the fluorescent screen can be delivered as direct as possible, without intermediate processing, and without parallax errors, to computers by which the desired evaluation is effected in accordance with preselectable programs.

In television engineering it is known to provide a so-called light pen, with which certain points on a fluorescent screen can be marked. Such a light pen comprises an optical system, which forms an image of a small portion of the fluorescent screen on a photoelectric transducer inside the light pen when that light pen is applied to the fluorescent screen. As the surface element represented by the image is brightened by the electron beam, the light pen generates a bright-up pulse which is delivered by an amplifier to the means which control the intensity of the electron beam so that a light spot is generated near or in the region to which the light pen is applied. That light spot is always generated to have a width corresponding to a plurality of lines. In the previous practice such light spot has only been used to direct the attention to selected portions of the fluorescent screen being observed but the use of the light pen for a determination of coordinates has not yet been contemplated. At best, the light pen could be directed to the interesting points in succession and the measuring instrument could then be directed to the same points. Because the light spot is always relatively large, an exact adjustment is not possible. In the known use of the light pen, its optical system delivers light pulses which represent the average brightness of that portion of the fluorescent screen which is being sensed. This results in the basic disadvantage that the light pen fails in the known arrangement unless part of that region of the fluorescent screen to which the optical system of the light pen is directed has areas which are sufficiently bright so that the optical system can induce a response of the photoelectric transducer because otherwise a bright-up pulse cannot be generated. It is apparent that the conventional light pen cannot be used to mark dark picture areas. In an effort to eliminate this disadvantage, a highly expensive arrangement has been proposed which comprises two fluorescent screens, in which the vertical and horizontal sweep, respectively, are synchronized. Only one fluorescent screen displays the desired picture because its electron beam is modulated in accordance with the instantaneous brightness of the picture. The second fluorescent screen exhibits a display of constant brightness. The light pen is applied to the latter fluorescent screen and the pulses generated by the light pen are amplified and used to brighten the first fluorescent screen at a point which corresponds to the point at which the light pen is applied to the first fluorescent screen. As a result, even entirely dark areas of the image can be marked. In that arrangement, too, the light spot which is generated is relatively coarse and can hardly be used for exact measurements. The area of the fluorescent screen to which the optical system of the light pen is applied has a diameter corresponding to some line widths and the light spot has a correspondingly large diameter.

SUMMARY OF THE INVENTION

It is an object of the invention to provide a method, and equipment for carrying out said method, by which a light pen can be used for an exact indication of selected points even if they are disposed in a dark area or an area of low brightness. Further, a direct evaluation of the coordinates of one or several points of the picture in accordance with predetermined and/or preselectable programs is to be made possible.

In the method according to the invention, this object is accomplished in that the light pen controls a pulse generator, which causes the display on the fluorescent screen of a light spot which constitutes a pilot area and has a size and brightness that are sufficient for a response of the light pen, the size of said light spot amounting, e.g., to one percent of the picture area, whereas the pulse generator also causes the display on the fluorescent screen of a defined target mark which has a predetermined geometric relation to said pilot area and is preferably disposed outside the latter.

It is thus a basic concept of the invention to move by means of the light pen said pilot area on the fluorescent screen so that the light pen is supplied with light from the pilot area which is moved with the light pen. The pilot area is so large that, even during a fast movement of the light pen, the optical system will form an image of at least part of said pilot area on the photoelectric transducer. The target mark may be small and clearly defined so that it permits an exact adjustment.

Means may be provided to arrange the target mark at predetermined relative positions around the pilot area. During the scanning of an object that is displayed in the middle of the fluorescent screen, that feature may be utilized to display the pilot area always outside the contours of the display of said object. It may also be used to move the target mark to the outermost regions of the fluorescent screen. The electron ray is preferably controlled to saturation brightness in the pilot area.

According to a preferred embodiment of the method according to the invention, suitable selector switches may be used for a selection of one of several configurations of the pilot area and/or in conjunction with a color picture tube to select one of several colors for the pilot area and to select also the color and/or configuration of the target mark. These possibilities will be particularly interesting in conjunction with features which will be described hereinafter and by which virtually permanent marks can be introduced into the display on the fluorescent screen by means of the light pen, where the term "permanent" is applicable to the duration of a given display, or in conjunction with evaluations carried out according to different programs, as will also be described hereinafter. For instance, the pen may be moved around the contours of a partial area and marks may be generated in the line which is thus traced. In accordance with an evaluation program, the distances between the generated marks or their coordinates are then ascertained. In accordance with another evaluation program, the length of the periphery of the circumscribed area or the magnitude of said area may be ascertained.

For a rapid electronic evaluation of the commands which can be given virtually by means of the light pen or of the data which are associated with target marks displayed at a given time, the coordinates of the target marks are ascertained from the instantaneous deflecting voltages and these data are stored or are fed to a computer for further evaluation. A plurality of stored data sets can be evaluated in accordance with different computing programs which include different logical commands. In another mode of operation, the coordinates of a target mark which has been displayed at a selected location are stored in coordinate storage devices and a target mark is displayed at the location defined by said coordinates under the control of arbitrarily operable selector means which cause said coordinates to be fetched from said storage device during the display of each picture of the fluorescent screen.

In the equipment for carrying out the method according to the invention, the receiving optical system of the light pen controls a pulse generator for generating bright-up pulse trains which cause a bright pilot area to be displayed in the region in which the light pen is applied to the fluorescent screen and for generating target pulses at times different from those of said pilot pulse trains, which target pulses cause the target mark to be displayed outside the pilot area. A given target mark may be displayed under the control of a plurality of target pulses, for instance, if a target mark is to be displayed as an intersection of two crossing lines or as a small circle. In principle, the bright-up pulse trains are always used to brighten an area and the target pulses cause a target mark to be displayed, which virtually constitutes a point.

In case it is desired not only to display a defined target mark but also to process the coordinates of said target mark or to combine them with other coordinates, a preferred feature of the invention resides in the provision of switches which are connected in parallel to the means for deflecting the electron beam and are arranged to close in response to the target pulses, particularly by means of a gate which is open only during the time when such target pulses may appear. The switches, when closed, deliver the instantaneous deflecting voltage corresponding to the target mark to indicating or evaluating or storage devices.

To permit the above-mentioned adjustment of the target mark relative to the pilot area, the pulse generator may comprise an adjustable timer which controls the timing of the target pulses relative to the bright-up pulse trains for brightening the pilot area. That timer is preferably used to change also the gate-opening and gate-closing times so that the target pulse appears while the gate is open.

It has already been mentioned that certain measures are only selectively adopted. For instance, when it is desired to hold target marks on certain lines, a switch is operated to hold the target mark in position. When it is desired to measure the periphery or area of defined portions of the picture, the distance moved by the light pen before it has reached the defined portion should not be included in the measurement. To that end, features must be embodied which permit certain operations to be selectively included in, and excluded from, the measurement. For instance, the tip of the light pen may constitute an actuator of a pressure-responsive switch which is connected in series with the switches that are arranged to close in response to the target pulses. In such an arrangement, the pressure-responsive switch can be actuated simply by urging the light pen against the fluorescent screen.

BRIEF DESCRIPTION OF THE DRAWING

Further details and advantages of the subject matter of the invention will become apparent from the following description of an embodiment of the invention shown by way of example on the accompanying drawing, in which FIG. 2 is a block circuit diagram showing the essential parts of equipment according to the invention and FIG. 3 is a pulse timing chart for the circuit arrangement shown in FIG. 2.

DETAILED DESCRIPTION OF A PREFERRED EMBODIMENT

Figure 1:
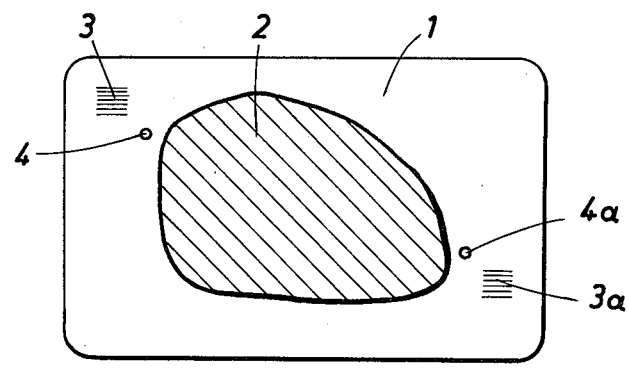
FIG. 1 is a highly simplified view showing a fluorescent screen which displays a pilot area shown in two possible positions, and an associated target mark.

FIG. 1 depicts a fluorescent screen 1, on which a picture is displayed which constitutes, e.g., a section display resulting from an ultrasonic examination of a section of a body organ. The interesting region of the display has been indicated by a hatched area 2. It may be required to ascertain the peripheral length or the magnitude of the area 2 or only to ascertain the distance between two or any two of several points at the edge of or within the area 2 or the coordinates of such points. In the method according to the invention, a light pen, not shown in FIG. 1, is used to move a pilot area 3 and a target mark 4, which is geometrically coordinated with said target area. Measures which will be described hereinafter are adopted to ascertain, at the time at which the target mark 4 is displayed, the instantaneous coordinates of the target mark 4, or the deflecting voltages that are equivalent to said coordinates and control the electron beam by which the picture is generated. In the manner described hereinbefore, individual points may be marked or the periphery or portions of the displayed area 2 may be traced with the target mark so that distances or a peripheral length or areas can be ascertained. Areas for indicating the results of these measurements may be provided near the edge of the fluorescent screen. As is indicated at 3a, 4a, the position of the target mark relative to the pilot area 3 may be altered if the target mark is to be moved to marginal portions of the fluorescent screen or if a penetration of all or part of the pilot area into the interesting area 2 is to be prevented. The circuit arrangement shown in FIG. 2 includes leads 5, 6 to which the deflecting voltages x and y, respectively are, applied, which control the electron beam that is incident on the fluorescent screen. Another lead 7 controls the intensity of the electron beam and conducts the signals required for the display of the picture 2. In a normal display unit, the lead 7 would directly control the means for controlling the intensity of the electron beam. Parts 8 to 18 constitute the means which are additionally provided according to the invention and may be incorporated in any conventional fluorescent screen display unit. The design of such units is not explained more in detail as it is generally known.

The arrangement according to the invention comprises a light pen 8. When that light pen is applied to a bright portion of the fluorescent screen, an optical system included in the light pen will generate light pulses in response to each scanning of said bright portion by the electron ray. These pulses are incident on a photoelectric transducer which converts the light pulses into electric pulses and delivers the latter as read pulses to a pulse shaper 9. In response to the read pulses, the pulse shaper generates a control pulse which is delivered to a pulse generator 10, and a gate-opening pulse which is delivered to the control input of a gate 11. In a program which will be described hereinafter, the pulse generator 10 generates bright-up pulse trains which are delivered both to an analog adder amplifier 12 and to the gate 11. In response to the brightness information delivered via lead 7 and the bright-up pulse trains, the analog adder 12 delivers a sum voltage via a lead 13 to the means for controlling the intensity of the electron beam. The gate 11 is open only during a predetermined time. That gate-open time is so selected that the bright-up pulse trains will not appear during that time and the target pulse which results in the display of the target mark 4 will appear during that time. That target pulse passes also through the then open gate and actuates two normally open electronic switches 14, 15, which are mounted in leads that branch from the leads 5, 6. As a result of this sampling of the deflecting voltages x and y in synchronism with the target pulses, the instantaneous deflecting voltages $x_0$ and $y_0$ which correspond to the coordinates of the target mark are delivered to leads 16, 17 connected to switches 14, 15, respectively. These instantaneous deflecting voltages may be properly processed and the results of such processing may be delivered to indicating means by which the coordinates may be digitally indicated, for instance. Alternatively, these voltages may be delivered to a computer or to a buffer memory. Depending on requirements, a write-over memory may be used, which at any given time stores only the last coordinate voltages, or a multi-address memory may be used, which preferably can be enabled for a certain method of ascertaining and can be subsequently disabled. In such an arrangement, all stored data are eventually delivered to a computer.

Figure 2:
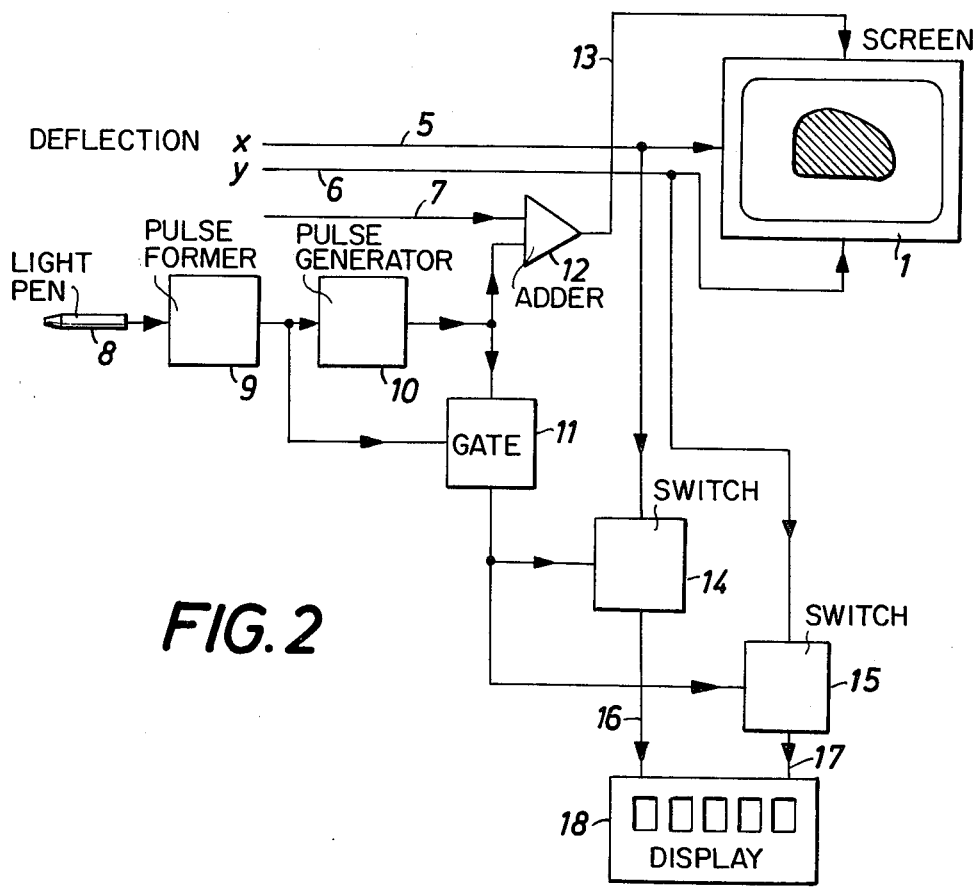

FIG. 3 is a pulse timing chart for a circuit arrangement as shown in FIG. 2. Line 8a shows the read pulses which are generated by the light pen 8 and delivered to the pulse shaper 9. Line 9a shows the control pulses delivered by the pulse shaper. Line 10a indicates the bright-up pulse trains delivered by pulse generator 10. Line 11a depicts the open times of gate 11.

OPERATION

The light pen 8 is responsive to a fluorescent screen area which covers a plurality of lines. The light pen 8 generates a pulse whenever that area is scanned by the electron beam. The spacing of the successive pulses corresponds to the trace interval, i.e., to 64 microseconds where the CCIR television standard calling for interlaced scanning is adopted. As the sensitivity of the photoelectric transducer in the light pen 8 decreases toward the edge in most cases, the pulse amplitudes will vary even though the brightness of the screen area sensed by the light pen is constant. FIG. 3 is based on the assumption that the light pen is responsive to an area having a width of five lines so that five read pulses are generated during the generation of a complete picture on the fluorescent screen. That operation is repeated during the next picture, i.e., after 20 ms when the CCIR television standard is used.

In the pulse shaper 9, each pulse train 8a generated during the display of one picture is converted into a single control pulse such as is shown in line 9a. It is by no means necessary that the control pulse coincides with the highest read pulse, as shown, but the control pulse should always coincide with the same pulse of a pulse train so that a steady picture will be obtained. If the light pen 8 is held at a selected location of the fluorescent screen, the spacing of the control pulses 9a will amount to 20 ms. That spacing may be longer or shorter if the light pen is moved.

The pulse generator 10 is triggered by the control pulse to generate bright-up pulse trains, which serve to mark the pilot area, and also generates with a delay to after the control pulse a target pulse, which has an extremely small width and controls the display of the target mark 4 and the closing of the switches 14, 15. The showing in line 10a is based on the assumption that the display on the fluorescent screen is effected in accordance with the CCIR television standard so that there are 50 pictures per second, each picture consists of 512 lines and the trace interval amounts to 64 microseconds. The target mark should consist only of a minute point. On the other hand, the pilot area should correspond to about 1% of the area of the fluorescent screen. It is apparent that in such case the side length of the pilot area is about 10% of the height or width of the fluorescent screen. For this reason, each of the bright-up pulses for marking the pilot area should have a width of about 6 microseconds and about 50 such pulses are required so that the display on the fluorescent screen is brightened up at the same width position in 50 such lines.

61 microseconds after the control pulse, the pulse generator 10 generates the first bright-up pulse having a width of 6 microseconds. As a result, the brightening in the picture line that directly succeeds the control pulse is initiated slightly before the point at which the bright-up pulse has been initiated and terminates behind said point. With the above-mentioned trace intervals of time of 64 microseconds, the pulse generator generates 24 additional bright-up pulses or a total of 25 bright-up pulses. The lower half of the pilot area 3 is thus brightened. This is succeeded by a pause, which is much longer than the previous pulse spacing but shorter than the time between two control pulses. Subsequently, 25 additional pulses having a width of 6 microseconds and a pulse spacing of 64 microseconds are generated. The last bright-up pulse coincides with the next control pulse or is symmetric with respect to the same. The tip of the light pen 8 is directed to the center of the approximately square pilot area 3 which is brightened. When the light pen is held with an inclination, its tip will be seemingly no longer directed exactly to the center of the pilot area. When the light pen is moved between two control pulses, one-half of the pilot area will be brightened first, in dependence on the timing of the corresponding control pulse, and the second half will be initially displayed in a normal manner as it depends on the first control pulse. The next following control pulse causes a new pilot area to be brightened, which is again symmetrical to the instantaneous position of the light pen 8. As the lower and upper halves are displayed with a time interval, the impression is created that, after a movement of the light pen, the lower half of the pilot area follows first and the upper half thereafter. It is apparent that the pilot area 3 will follow the light pen unless the latter has been moved entirely out of the pilot area 3 between two control pulses. When the equipment is switched on or when the pilot area has disappeared, the light pen may be applied to any desired bright region of the fluorescent screen; the pilot area will then be brightened immediately. a brighhtened area may be constantly displayed near an edge or a corner of the fluorescent screen and the light pen may be applied to such area. The amplitude of the bright-up pulses is preferably so large that a saturation brightness is achieved.

After a delay of $t_0$, a short target pulse having a width of, e.g., 0.2 microsecond, is generated between the bright-up pulse trains which are associated with a control pulse and serve to brighten the pilot area 3. That target pulse defines the location of the target mark 4 and, as long as the time $t_0$ is not changed, that mark will always have the same location relative to the pilot area 3. The delay $t_0$ can be changed by means of a timer so that the position of the target mark relative to the pilot area can be altered. A change of the delay $t_0$ will not change the result of the measurement because the ascertaining of the coordinates and the other processing depend only on the position and/or displacement of the target mark 4 rather than on its location relative to the pilot area 3. When the delay $t_0$ is changed, the open and closed times of the gate 11 will be changed accordingly so that the target pulse will appear only when the gate is open.

Various possibilities regarding the coordinate voltages appearing at 16 and 17 and the processing of such voltage have been indicated hereinbefore. In the simplest case, the voltages are applied to an analog-to-digital converter 18 and the target mark coordinates are digitally indicated. Alternatively, a manual switch may be operated to deliver the coordinates to storage devices and the coordinates of additional target marks may be stored so that the distances between the target marks may be calculated in a computer from the stored coordinate data. The length of curved lines or the peripheral extent or magnitude of circumscribed areas can be derived from the locations of target marks or as a result of a tracing of the contours with the target mark. If the coordinates of a target mark are stored in a memory in which the fluorescent screen picture is preferably stored, too, individual target marks can be permanently displayed regardless of the instantaneous position of the light pen. The configuration and size of the pilot area 3 can be changed by a change of the number and width of the pulses generated by the pulse generator 10. The number of bright-up pulses may be controlled by means of a preferably presettable counter which counts the lines, and the width of the bright-up pulses may be controlled by time counters. Various possible forms in which the target mark can be displayed have also been mentioned hereinbefore. Another possible way comprises the use of a switch for inverting the target pulse so that the target mark is displayed as a dark mark in very bright areas of the picture and can thus be clearly visible in such areas.

What is claimed is:

1. In a method of marking and evaluating or measuring successive pictures displayed on a fluorescent screen by an electron beam scanning the screen, by means of a light pen, the light pen having an operative position directing a receiving optical system towards screen areas brightened by the electron beam and transducing the light received by the optical system from the brightened screen areas to generate bright-up control pulses for intensifying the electron beam whereby a light spot appears in an area of the screen towards which the light pen optical system is directed, the steps of
 (a) generating target pulses in response to the bright-up control pulses, the target pulses causing the display of
  (1) a light spot forming a pilot area for the light pen on the screen, the pilot area being about one percent of the area of the screen, and
  (2) a sharply defined target mark having coordinates determining a predetermined geometrical relation of the target mark outside and adjacent the pilot area,
 (b) ascertaining the coordinates of the target mark on the basis of the instantaneous deflecting voltage of the electron beam, and (c) using the ascertained coordinates of the target mark to measure distances between points, the periphery or the area of the pictures.

2. In the method of claim 1, the step of varying the timing of the target pulse generation so that the target mark is displayed at one of a plurality of predetermined locations relative to the pilot area.

3. In the method of claim 1 or 2, the step of intensifying the electron beam in response to the bright-up control pulses so that the pilot area is displayed with saturation brightness.

4. In the method of claim 1 or 2, the step of so timing the bright-up control pulses that the pilot area is displayed in a selected one of a plurality of available configurations.

5. In the method of claim 1 or 2, the step of so timing the bright-up control pulses that the pilot area is displayed in a selected one of a plurality of available colors.

6. In the method of claim 1 or 2, the steps of subjecting the electron beam to horizontal and vertical deflecting voltages varied to cause the beam to scan the screen, sampling the deflecting voltages in synchronism with the target pulses to ascertain the coordinates of the target mark, storing the coordinates, retrieving the stored coordinates during the display of each one of the pictures on the screen, and utilizing the retrieved coordinates to cause the target mark to be displayed in the predetermined geometrical relation.

7. In display equipment comprising a fluorescent screen, display control means including horizontal and vertical deflecting voltages for generating an electron beam and scanning the screen to display thereon successive pictures, and a light pen having an operative position directing a receiving optical system towards screen areas brightened by the electron beam and transducing the light received by the optical system from the brightened screen areas to generate bright-up control pulses for intensifying the electron beam whereby a light spot appears in the area of the screen towards which the light pen optical system is directed:

(a) a pulse generator controlled by, and responsive to, the bright-up control pulses generated by the light pen, the pulse generator being operable to generate bright-up pulse trains timed relative to the control pulses to display a pilot area in said area of the screen and target pulses in a predetermined timed relationship to the bright-up pulse trains to display sharply defined target marks having coordinates determining a predetermined geometrical relation of the marks outside and adjacent the pilot area, (b) switch means arranged parallel to the deflecting voltages generating means for the electron beam and controlled by the target pulses to be closed in response thereto, and (c) means receiving the instantaneous deflecting voltages corresponding to the coordinates of the target marks upon closing of the switch means.

8. In the equipment of claim 7, the pulse generator including an adjustable timing means for varying the timing of the target pulses relative to the bright-up pulse trains.

9. In the equipment of claim 7 or 8, wherein the light pen has a point constituting a sensor of a pressure switch and the pressure switch is arranged in advance of the switch means.

10. In the equipment of claim 7, a gate controlling the switch means and open only during the time when a target pulse is generated.

* * * * *